United States Patent [19]
Komai et al.

[11] Patent Number: 5,945,064
[45] Date of Patent: Aug. 31, 1999

[54] WELDING MATERIAL FOR LOW CHROMIUM (CR) FERRITIC STEEL HAVING HIGH TOUGHNESS

[75] Inventors: Nobuyoshi Komai; Takayuki Kawano; Fujimitsu Masuyama; Iwami Ishihara, all of Nagasaki; Tomomitsu Yokoyama, Tokyo, all of Japan

[73] Assignee: Mitsubishi Heavy Industries, Ltd., Tokyo, Japan

[21] Appl. No.: 09/057,813

[22] Filed: Apr. 9, 1998

[30] Foreign Application Priority Data

Apr. 9, 1997 [JP] Japan .................................. 9-090504

[51] Int. Cl.⁶ ............................ C22C 38/44; C22C 38/48
[52] U.S. Cl. .............................. 420/40; 420/106; 420/109
[58] Field of Search ................................ 420/40, 106, 109

[56] References Cited

U.S. PATENT DOCUMENTS 5,211,909  5/1993  Iseda et al. ............................... 420/106
5,407,635  4/1995  Iseda et al. ............................... 420/106

FOREIGN PATENT DOCUMENTS 0 505 732  9/1992  European Pat. Off. .
0 560 375  9/1993  European Pat. Off. .
0 787 813  8/1997  European Pat. Off. .

OTHER PUBLICATIONS

Toughness and Creep Strength of Modified 2.25Cr–1Mo Steel Weld Metal, K. Ichikawa et al., Welding Journal, Jul. (1995), No. 7, pp. 230–238.

*Primary Examiner*—Deborah Yee
*Attorney, Agent, or Firm*—Alston & Bird LLP

[57] ABSTRACT

This invention provides a welding material for low chromium (Cr) ferritic heat-resisting steel having high toughness, wherein the chemical composition of welding metal comprises, in weight %, carbon (c) 0.04–0.1%, silicon (Si) 0.1–0.6%, manganese (Mn) 0.1–0.6%, phosphorus (P) 0.0005–0.03%, sulfur (S) 0.0005–0.015%, chromium (Cr) 1.75–2.5%, nickel (Ni) 0.01–0.8%, molybdenum (Mo) 0.05–1.5%, vanadium (V) 0.01–0.5%, tungsten (W) 0.05–2%, niobium (Nb) 0.01–0.2%, tantalum (Ta) 0.01–0.5%, aluminum (Al) 0.003–0.05%, boron (B) 0.0001–0.01%, nitrogen (N) 0.003–0.03%, and the remainder comprises iron and inevitable impurities. The welding material satisfies the following formula: $C+Cr/20+Mo/15+V/10+W/7+5B \leq 0.8\%$. According to this invention, the welding material is suitable for welding low Cr ferritic heat-resisting steels having high strength such as those used in steam generators and heat exchangers of boilers, etc. which are exposed to high temperatures and high pressures, more particularly, at a high temperature of 500° C. or more.

9 Claims, 1 Drawing Sheet

WELDING MATERIAL FOR LOW CHROMIUM (CR) FERRITIC STEEL HAVING HIGH TOUGHNESS

FIELD OF THE INVENTION AND RELATED ART STATEMENT

This invention relates to a welding material for steam generators, heat exchangers for boilers, and so forth used at a high temperature and under a high pressure. More particularly, this invention relates to a welding material suitable for the welding of high-strength low-chromium (Cr) ferritic heat-resisting steel used at high temperature not less than 500° C.

As a high temperature heat-resisting and pressure-tight member used for boilers, chemical industries, and nuclear power plants, there are austenite stainless steels, high Cr ferritic steels containing 9–12% of Cr, low Cr ferritic steels represented by 2.25 Cr-1 Mo steel, carbon steels and so forth (hereinafter the amount of content in the alloy composition is indicated by % in weight). Some of these are selected depending on the temperature, pressure and environment used for the object member, and in consideration of the cost efficiency. Particularly, from the economical point of view, low Cr ferritic steels having relatively less content of Cr with high strength are much sought after. Even the low Cr ferritic steel having the same strength as that of the high Cr ferritic steel has already been developed. For such material to be practically usable, it is indispensable to develop welding materials having the same strength as that of those original materials. However, welding materials having high strength have little toughness in general, as it has been difficult to have the two contradictory characteristics, strength and toughness or tenacity.

OBJECT AND SUMMARY OF THE INVENTION

The object of this invention is to provide an improved welding material having high toughness as welding metal, and having remarkably improved high-temperature strength compared with conventional welding materials.

To achieve the above object, the inventors of this invention repeated a number of experiments on welding materials with high strength at high temperatures not less than 500° C. and with high toughness, considering the effect of precipitation by using vanadium (V) and niobium (Nb), the solid-solution hardening by tungsten(W) and rhenium (Re), and the effect of precipitation of fine carbide particles, and in consequence of the above, the following results have been realized and acquired:

(a) While as the conventional welding material for the low Cr ferritic heat-resisting steels, Cr—Mo steels containing Mo as a major component have been generally known, the use of improved material containing a great deal of W whose atomic radius is large but diffusion coefficient is small compared with those of Mo allows us to achieve a considerable enhancement of solid-solution strengthening, and also improves the stability of fine carbide particles at a high temperature which contributes to the creep strength.

(b) Further, the addition of Re whose atomic radius is larger than that of W permits us to anticipate further solid-solution strengthening.

(c) However, the welding material with the addition of V or Nb which is a carbide-forming element remains very hard with poor impact characteristics even after welding and stress-relief annealing.

(d) However, it is found that the concurrent addition of tantalum (Ta) which is also a carbide-forming element causes the structure of the welding metal to be remarkably fine-grained and to largely improve the impact characteristics. The melting point of Ta carbides is 3400–3877° C. which is very much higher than that of V or Nb carbide, which causes the Ta carbides to remain as precipitate in the form of Ta carbide finely dispersed into the solidified welding metal, whereas the majority of V or Nb carbides form solid-solution when the welding metal is melted. Therefore, the finely dispersed Ta carbide particulates form nuclei, and the martensite and bainite textures which become transformed upon solidification become very much fine-grained. Even if the welding is continued and reheating occurs, the finely dispersed Ta carbide particles show a pinning effect to restrict grain growth and keep the texture fine-grained. The fine-grained texture makes brittle fracture, more difficult to occur, and improves toughness or tenacity.

(e) Also, the addition of boron (B) allows the solid solution of boron to contribute to the improvement of creep strength.

(f) There is a possibility of cracking when welding, but this cracking may be prevented by appropriately choosing the quantities of added elements.

As a result of the above, the present invention has been completed. That is to say, the present invention relates to a welding material for low Cr ferritic heat-resisting steel having high toughness with the following composition (1) or (2):

(1) A welding material for low Cr ferritic heat-resisting steel having high toughness comprising, in weight %, carbon (C) 0.04–0.1%, silicon (Si) 0.1–0.6%, manganese (Mn) 0.1–0.6%, phosphorus (P) 0.0005–0.03%, sulfur (S) 0.0005–0.015%, chromium (Cr) 1.75–2.5%, nickel (Ni) 0.01–0.8%, molybdenum (Mo) 0.05–1.5%, vanadium(V) 0.01–0.5%, tungsten (W) 0.05–2%, niobium (Nb) 0.01–0.2%, tantalum (Ta) 0.01–0.5%, aluminum (Al) 0.003–0.05%, boron (B) 0.0001–0.01%, nitrogen (N) 0.003–0.03%, and the remaining comprising iron and inevitable impurities, and satisfying the conditions of the following formula (a) wherein each component is expressed in terms of weight percent value:

$$C+Cr/20+Mo/15+V/10+W/7+5B \leq 0.8\% \tag{a}$$

(2) A welding material comprising 0.03–1% of Re in weight %, in addition to the components described above in (1), and satisfying the conditions of the following formula (b) wherein each component is expressed in terms of weight percent value:

$$C+Cr/20+Mo/15+V/10+W/7+Re/3+5B \leq 0.8\% \tag{b}$$

DETAILED DESCRIPTION OF PREFERRED EMBODIMENTS

Figure 1:
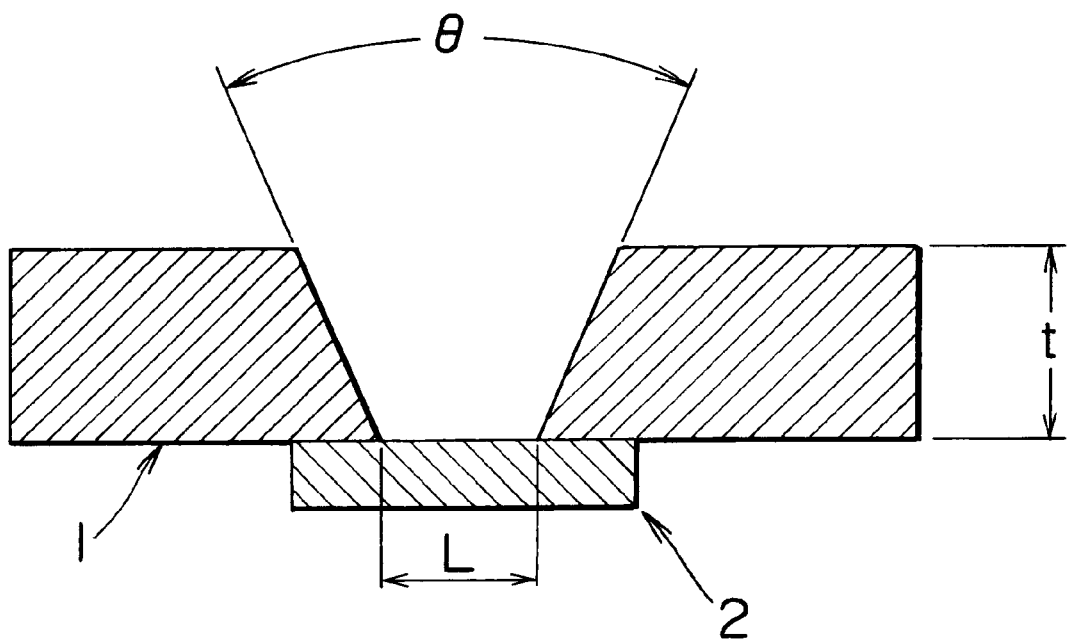
FIG. 1 is a descriptive view showing the status of the groove at the time of welding the steel sheet. In the figure, No. 1 represents a welding material, and No. 2 represents a backing material.

The actions of each component and its content together with possible rationale for such selection are described below.

The addition of carbon (C) allows the formation of carbides with chromium (Cr), iron (Fe), tungsten (W), vanadium (V), and niobium (Nb), which contribute to high temperature strength and stabilize the structure as austenite-stabilizing elements. A carbon content of less than 0.04% would result in insufficient carbide precipitation and lower creep rupture strength, while a content exceeding 0.1% results in excessive carbide precipitation and considerable hardening of the welding metal, degrading impact characteristics. The weldability deteriorates with increasing carbon contents. Thus, the desirable content of C would be 0.04–0.1%. Within this range, to provide good weldability and high temperature strength simultaneously, the carbon content of 0.05–0.08% is more desirable.

Silicon (Si) acts as a deoxidizing agent. If its content exceeds 0.6%, toughness will considerably be lowered, and silicon becomes disadvantageous against its strength. The proper content of Si would be 0.1–0.6%. For better high temperature strength, a smaller amount of Si should be added, i.e. 0.1–0.3% would be desirable.

The addition of manganese (Mn) is effective to stabilize the structure. However, if its content is less than 0.1%, sufficient effects cannot be obtained, whereas if it exceeds 0.6%, the welding material becomes hard. Consequently, the desirable content of Mn would be 0.1–0.6%. Similarly to the characteristics of Si, lowering its amount to 0.1–0.3% improves the temperature strength.

Both phosphorus (P) and sulfur (S) are elements disadvantageous for toughness and creep strength. Even a very small amount of S makes grain boundary and $Cr_2O_3$ scale film unstable and strength and toughness lower, so it is desirable to have smaller amounts even within the allowable ranges. As inevitable contents, P is 0.005–0.03% and S is 0.005–0.015%.

Chromium (Cr) is an indispensable element from the viewpoint of anti-oxidization characteristics and high temperature corrosiveness of heat-resisting steels. If its content does not exceed 1.75%, sufficient anti-oxidizing and high temperature corrosiveness cannot be obtained. On the other hand, when the content of Cr exceeds 2.5%, the compositional difference with the base metal becomes large. This may cause carbon to shift between the welding metal and the base metal, making the weld fragile. Also, a larger amount of Cr is disadvantageous from the economic point of view, thus the content of Cr should be 1.75–2.5%.

Nickel (Ni) is an austenite stabilizing element, and improves the toughness of steel. However, if its content exceeds 0.8%, the high temperature creep strength becomes lost. Also, from the economic point of view, adding a large quantity of Ni is disadvantageous. Consequently, the content of Ni should be 0.01–0.8%. Although this depends on the amounts of the other added elements, if the impact value at a temperature of 0° C. exceeds 100 $J/cm^2$, the amount of Ni to be added can be reduced so as to give an Ni content of 0.01–0.3%.

Molybdenum (Mo) is effective to improve the creep strength, but if its content does not exceed 0.05%, sufficient results cannot be obtained. Also, when the content exceeds 1.5%, intermetallic compounds precipitate at high temperatures, reducing toughness, and Mo loses its effectiveness for improved strength. Consequently, its content should be 0.05–1.5%.

Vanadium (V) combines with carbon and nitrogen to form a fine precipitant such as V (C, N). This precipitant improves the creep strength at a high temperature over exceeded periods of time, but if its content is less than 0.01% sufficient effect can not be achieved. Also, if its content exceeds 0.5%, creep strength and toughness become lost. Consequently, the desirable content of V should be 0.01–0.5%. Particularly, in order to maintain the strength and toughness at high temperatures, a content of 0.15–0.3% would be preferable.

Tungsten (W) is effective for improving the creep strength as a solid-solution strengthening element and a fine carbide precipitation strengthening element. Particularly, combined with Mo, the creep strength can be further enhanced. If its content is less than 0.05%, such effectiveness cannot be obtained. If its content exceeds 2%, the steel becomes hardened, leading to a loss of weldability. Consequently, its desirable content should be in the range of 0.05–2%.

Niobium (Nb) combines with C and N to form Nb (C, N) much the same way as with V, and contributes to creep strength. Particularly, such a combination at a comparatively low temperature of 600° C. or below shows the strength to be improved remarkably. Also, niobium causes the structure of the welding metal to become finer, and also improves the toughness if its content is appropriate. If its content does not exceed 0.01% the above-mentioned effects cannot be achieved. Also, when the content is more than 0.2%, NbC, which does not form solid solution, increases and the welding material loses creep strength and toughness. Consequently, the desirable content of Nb should be 0.01–0.2%.

Tantalum (Ta) is the most significant characteristic component of the wire according to the present invention. When added in an appropriate amount, it causes the grain size of welding metal to be very fine, and the impact characteristic to improve significantly. Also, it has been found to improve the creep strength as well. Its desirable content should be 0.01–0.5%. To have good impact characteristic and creep strength simultaneously, the content of 0.05–0.25% is preferred.

Aluminum (Al) is indispensable as a deoxidation element. If its content is less than 0.003%, it does not show sufficient performance as a deoxidizer. When the content is more than 0.05%, the creep strength becomes lost. Consequently, its desirable content would be 0.003–0.05%. Because a smaller amount of Al added results in a smaller loss in creep strength, a content of 0.003–0.01% is preferred.

Extremely small amounts of boron (B) cause the carbides to be dispersed and become stable. If its content is less than 0.0001% such actions will be insufficient. When the content exceeds 0.01%, the weldability suffers. Consequently, its preferred content falls in the range of 0.0001% to 0.01%.

Nitrogen (N) is indispensable for forming carbonitrides with V and Nb. If its content is less than 0.003% such action will be insufficient. However, if it exceeds 0.03%, the nitrides become large in size, and the strength and toughness of the material suffers. Consequently, its proper content would be 0.03% or less, and preferably 0.003–0.03%, and considering the toughness, a range of 0.003–0.015% is even more desirable.

For the welding material (for low chromium (Cr) ferritic heat-resisting steels) having the above compositions, to have high toughness, the following relationship should be satisfied among the components:

$$C+Cr/20+Mo/15+V/10+W/7+5B \leq 0.8\%,$$

wherein each component is expressed in terms of weight percent value.

Further, rhenium (Re) can be added to the above components. Re enhances the creep strength in proportion to its amount. This is because of the solid-solution strengthening. Also, adding a considerable amount of molybdenum (Mo), or tungsten (W) which acts similarly to Re, causes the creep strength to be further increased. Accordingly, from an economic point of view, the proper content of Re would be 0.03–1%.

C, Cr, Mo, V, W, Re and B should be present to satisfy the following formula:

$C+Cr/20+Mo/15+V/10+W/7+Re/3+5B \leq 0.8\%$, wherein each component is expressed in terms of weight percent value. This is because it was found that if the above formula is satisfied no cracks are formed on the welding metal at the time of welding and no harmful influence has been found on the weldability. If the left-hand side of the above equation exceeds 0.8%, the welding metal might be cracked or weldability becomes deteriorated.

The welding material according to the present invention shows higher toughness and greatly improved creep strength at high temperatures, compared with the conventional welding wire for 2Cr steels. By using the welding material according to the present invention for welding low Cr ferritic steel having high strength to be used in boilers for various electric generation plants, chemical pressure vessels, etc., the reliability of welded joints may be largely improved.

A preferred embodiment according to the present invention will now be described with reference to the drawings, but the present invention is not limited to this embodiment.

As illustrated in Table 1, welding was conducted by way of TIG welding under preheating at 200° C. by forming a groove as illustrated in FIG. 1 (the thickness t of welded material 1 is 20 mm, the angle of groove θ=20°, the root gap L is 20 mm using backing material 2) with a 2.25 Cr-1 Mo steel sheet (JIS SCMV4) available on the market, and by using welding wire of 1.6 mm in diameter. Table 2 shows chemical compositions of welding metals. It was confirmed that the chemical compositions of the wire were almost the same as those of weld metal. A heat treatment was conducted as a post-heat treatment (stress relief annealing) on the weld metal obtained by TIG welding at a preheating temperature of 715° C. for 1 hour.

For the evaluation of weld metal characteristics, the measurement of the grain size of weld metals, the measurement of crack occurrence, creep rupture test, Charpy impact test, and evaluation for the weldability were conducted. Table 3 shows the results of these tests and evaluations as listed. Each test result will now be discussed.

(1) Measurement of Crystal Grain Size

The grain size of welding metals was measured in accordance with JIS G0552 using the cutting method. It was found that the grain size numbers for the comparative materials was 4 to 6, and about 128 to 512 pieces of crystal grains were found per 1 mm² in the cross section area, while the grain size number of the material according to the present invention is 8 or more, and the material has a very microscopic structure containing crystal grains of 2048 pieces or more per 1 mm² in the cross section area. It should also be noted that the comparative materials with Ta added show relatively small crystal grain sizes. This suggests that, for the material according to the present invention, the crystal grain size is smaller because of combined addition of suitable quantities of Nb and Ta.

(2) Crack Ratio Measurement

The cracking in the welding metal was measured by observing the cross section of welding metal as a ratio of crack length to the thickness of steel sheet. From this measurement, no crack was found in the welding metal according to the present invention. While in the comparative material, various degrees of cracking were found, and cracks were found in every material, which is not desirable because repairs would become necessary to actively use such material.

(3) Creep Rupture Test

Sample fragments for the creep rupture test were taken from the welding metal, and experiments were conducted in the testing condition of 650° C.×130, 120, 110, 100, 90, 80, 70 Mpa. Table 3 shows the data obtained for estimated 600° C.×$10^5$ h average creep rupture strength based on the results of such experiments. The welding metal according to the present invention has a 600° C.×$10^5$ h creep rupture strength of 100 Mpa or more, which is beyond the strength of high strength low Cr ferritic steels developed very recently. The creep rupture strength of some comparative welding metals exceeds the strength of conventional 2.25 Cr-1 Mo welding metals, but their strength is 60 Mpa or less, and the creep rupture strength is poorer than that of the material according to the present invention.

(4) Charpy Impact Test

Charpy impact tests were conducted at 0° C. using 2 mm V-notch test samples, and the impact characteristic was evaluated in terms of an average of Charpy impact values. The impact values of the material according to the present invention are generally high, and all of them are 100 J/cm² or higher. Also the impact values are obviously related to the grain size, and if the grain size is larger (if the grain size numbers are smaller), the impact values will be higher.

TABLE 1

| Current (A) | Voltage (V) | Welding speed (cm/mm) | Heat input (kJ/cm) | Pre-heating | Treatment of after heating |
|---|---|---|---|---|---|
| 170–230 | 10–24 | 7–12 | 1.1–2.3 | 200° C. | 715° C. × 1h |

TABLE 2

Chemical Composition of Welding Metals (in Weight %)

| Category | Symbol | C | Si | Mn | P | S | Cr | Ni | Mo | V | W | Re | Nb | Ta | Al | B | N | C + Cr/20 + Mo/15 + V/10 + W/7 + Re/3 + 5 × B |
|---|---|---|---|---|---|---|---|---|---|---|---|---|---|---|---|---|---|---|
| Materials | T1 | 0.07 | 0.16 | 0.15 | 0.010 | 0.005 | 2.24 | 0.05 | 0.15 | 0.05 | 0.14 | — | 0.08 | 0.43 | 0.008 | 0.005 | 0.012 | 0.242 |
| According | T2 | 0.06 | 0.25 | 0.34 | 0.008 | 0.001 | 2.13 | 0.23 | 0.20 | 0.23 | 0.56 | — | 0.06 | 0.04 | 0.009 | 0.008 | 0.004 | 0.323 |
| to the | T3 | 0.06 | 0.35 | 0.29 | 0.006 | 0.009 | 2.38 | 0.38 | 0.18 | 0.31 | 1.43 | — | 0.09 | 0.08 | 0.011 | 0.008 | 0.005 | 0.466 |
| Present | T4 | 0.04 | 0.56 | 0.58 | 0.004 | 0.008 | 1.86 | 0.43 | 1.03 | 0.28 | 1.02 | — | 0.13 | 0.23 | 0.007 | 0.004 | 0.006 | 0.395 |
| Invention | T5 | 0.09 | 0.45 | 0.46 | 0.021 | 0.011 | 2.40 | 0.78 | 1.46 | 0.46 | 1.13 | — | 0.02 | 0.25 | 0.026 | 0.001 | 0.007 | 0.517 |
|  | T6 | 0.07 | 0.23 | 0.23 | 0.008 | 0.004 | 2.18 | 0.08 | 0.08 | 0.23 | 1.68 | 0.13 | 0.06 | 0.15 | 0.007 | 0.004 | 0.008 | 0.511 |
|  | T7 | 0.08 | 0.45 | 0.35 | 0.010 | 0.006 | 2.34 | 0.35 | 0.23 | 0.29 | 1.35 | 0.70 | 0.09 | 0.23 | 0.01 | 0.006 | 0.013 | 0.698 |

TABLE 2-continued

Chemical Composition of Welding Metals (in Weight %)

| Category | Symbol | C | Si | Mn | P | S | Cr | Ni | Mo | V | W | Re | Nb | Ta | Al | B | N | C + Cr/20 + Mo/15 + V/10 + W/7 + Re/3 + 5 × B |
|---|---|---|---|---|---|---|---|---|---|---|---|---|---|---|---|---|---|---|
| Compara- | T10 | 0.15 | 0.80 | 0.45 | 0.008 | 0.005 | 2.05 | 0.98 | 1.85 | 0.05 | 3.23 | — | 0.03 | — | 0.010 | — | 0.008 | 0.842 |
| tive | T11 | 0.14 | 0.33 | 0.72 | 0.006 | 0.006 | 2.35 | 0.87 | 1.22 | 0.46 | 0.54 | — | 0.13 | — | 0.030 | 0.073 | 0.150 | 0.827 |
| Materials | T12 | 0.12 | 0.33 | 0.38 | 0.007 | 0.006 | 2.96 | 0.66 | 0.12 | 0.28 | 2.45 | — | 0.23 | 0.45 | 0.004 | 0.032 | 0.021 | 0.814 |
| | T13 | 0.13 | 0.58 | 0.53 | 0.028 | 0.008 | 2.76 | 0.31 | — | 0.32 | 3.18 | — | 0.13 | 0.35 | 0.007 | 0.014 | 0.010 | 0.824 |
| | T14 | 0.26 | 0.54 | 1.42 | 0.026 | 0.012 | 1.56 | 0.36 | 1.35 | 0.56 | 1.92 | — | — | 0.86 | 0.008 | 0.013 | 0.026 | 0.823 |

TABLE 3

| Category | Symbol | Crystal Grain Size Number | 600° C. × 10⁵ h Creep Rupture Strength (MPa) | Impact Characteristic 0° C. Impact Value (J/cm²) | Crack (%) | Welding Workability |
|---|---|---|---|---|---|---|
| Materials | T1 | 8 | 120 | 110 | 0 | ⊚ |
| According | T2 | 9 | 118 | 148 | 0 | ⊚ |
| to the | T3 | 8 | 108 | 168 | 0 | ⊚ |
| Present | T4 | 9 | 130 | 146 | 0 | ⊚ |
| Invention | T5 | 8 | 140 | 156 | 0 | ⊚ |
| | T6 | 8 | 147 | 139 | 0 | ⊚ |
| | T7 | 9 | 153 | 168 | 0 | ⊚ |
| Compara- | T10 | 4 | 48 | 55 | 3 | Δ |
| tive | T11 | 5 | 59 | 35 | 15 | Δ |
| Materials | T12 | 6 | 38 | 18 | 32 | x |
| | T13 | 6 | 43 | 17 | 35 | x |
| | T14 | 4 | 54 | 15 | 43 | x |

Welding Workability Evaluation Standards:
⊚: Compared with the welding material for the conventional 2.25 Cr-1 Mo steel, the arc is more stable, and welding operations with layer electric current are possible.
o: Has similar workability as that for the conventional welding material.
Δ: Melt flow is not smooth, and blowholes occur, necessitating partial repairs (alteration).
x: Arc is unstable, so cracks are found covering more than 30% of the weld section. Not practically usable.

What is claimed is:

1. A welding material for low chromium (Cr) ferritic heat-resisting steel having high toughness, comprising, in weight %, carbon (C) 0.04–0.1%, silicon (Si) 0.1–0.6%, manganese (Mn) 0.1–0.6%, phosphorus (P) 0.0005–0.03%, sulfur (S) 0.0005–0.015%, chromium (Cr) 1.75–2.5%, nickel (Ni) 0.01–0.8%, molybdenum (Mo) 0.05–1.5%, vanadium (V) 0.01–0.5%, tungsten (W) 0.05–2%, niobium (Nb) 0.01–0.2%, tantalum (Ta) 0.01–0.5%, aluminum (Al) 0.003–0.05%, boron (B) 0.0001–0.01%, nitrogen (N) 0.003–0.03%, and rhenium (Re) 0.03–1%, the remainder being essentially iron and inevitable impurities, said welding material satisfying the following formula (b):

$$C+Cr/20+Mo/15+V/10+W/7+Re/3+5B \leq 0.8\% \quad (b)$$

wherein each component is expressed in terms of weight percent.

2. A welding material for low chromium (Cr) ferritic heat-resisting steel having high toughness according to claim 1, wherein carbon (C) is 0.05–0.08%.

3. A welding material for low chromium (Cr) ferritic heat-resisting steel having high toughness according to claim 1, wherein silicon (Si) is 0.1–0.3%.

4. A welding material for low chromium (Cr) ferritic heat-resisting steel having high toughness according to claim 1, wherein manganese (Mn) is 0.1–0.3%.

5. A welding material for low chromium (Cr) ferritic heat-resisting steel having high toughness according to claim 1, wherein nickel (Ni) is 0.01–0.3%.

6. A welding material for low chromium (Cr) ferritic heat-resisting steel having high toughness according to claim 1, wherein vanadium (V) is 0.15–0.3%.

7. A welding material for low chromium (Cr) ferritic heat-resisting steel having high toughness according to claim 1, wherein tantalum (Ta) is 0.01–0.5%.

8. A welding material for low chromium (Cr) ferritic heat-resisting steel having high toughness according to claim 1, wherein aluminum (Al) is 0.003–0.01%.

9. A welding material for low chromium (Cr) ferritic heat-resisting steel having high toughness according to claim 1, wherein nitrogen is (N) 0.003–0.015%.

* * * * *